Nov. 16, 1954     J. G. LEE     2,694,357
BOUNDARY LAYER ENERGIZATION FOR FLUSH INLETS
Filed July 18, 1950     2 Sheets-Sheet 1

Inventor
John G. Lee
by Leonard F. Wekland
Agent

Nov. 16, 1954  J. G. LEE  2,694,357
BOUNDARY LAYER ENERGIZATION FOR FLUSH INLETS
Filed July 18, 1950  2 Sheets-Sheet 2
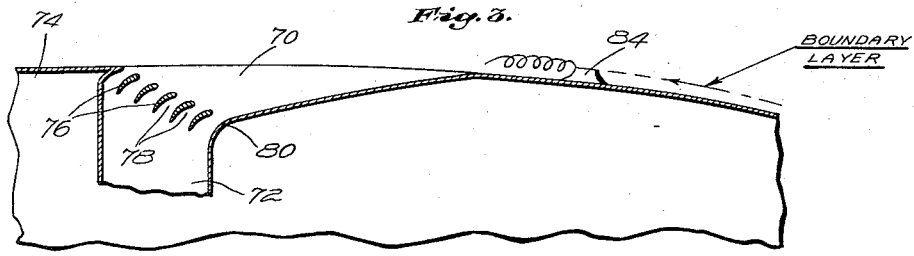
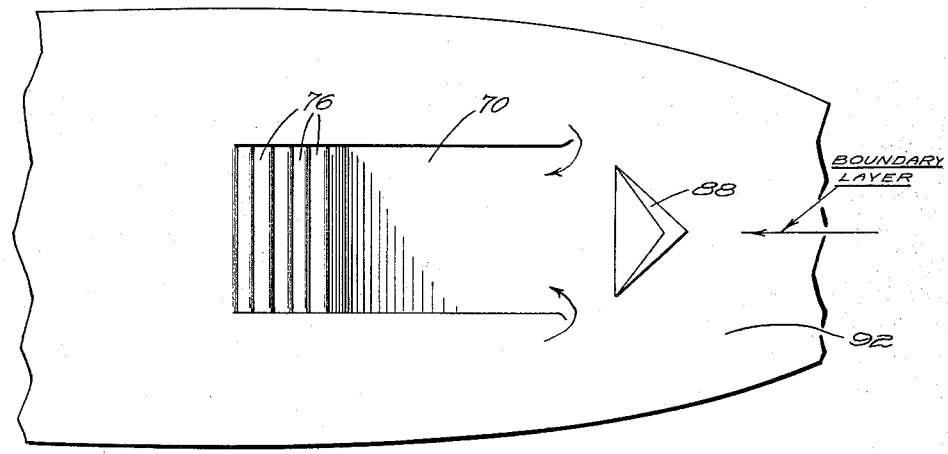
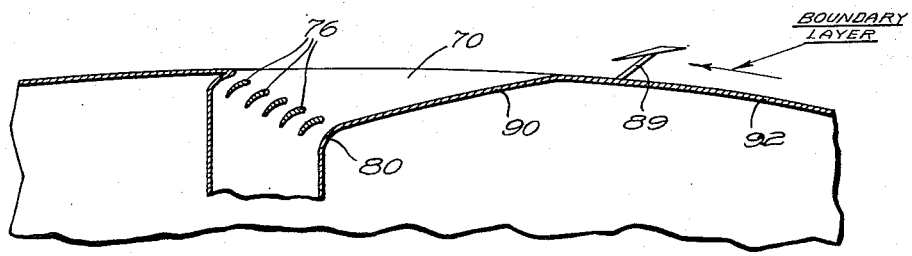

2,694,357
Patented Nov. 16, 1954

United States Patent Office

2,694,357

BOUNDARY LAYER ENERGIZATION FOR FLUSH INLETS

John G. Lee, Farmington, Conn., assignor, by mesne assignments, to Chance Vought Aircraft, Incorporated, a corporation of Delaware Application July 18, 1950, Serial No. 174,520

14 Claims. (Cl. 98—1)

This invention relates to air inlets for aircraft and more specifically to means for improving flow efficiencies for flush type air inlets.

It is an object of this invention to improve flow efficiencies and pressure recovery in flush or recessed type air inlets for aircraft.

It is another object of this invention to improve the cross-sectional velocity distribution across the openings of flush type inlets.

A further object of this invention is to energize the boundary layer upstream of flush type inlets in order to prevent separation over the upstream lip of such inlets and within air ducts leading therefrom.

A still further object of this invention is to energize boundary layer flow by means of vortex generating fins located externally of the aircraft upstream of the flush inlet.

Another object of this invention is to provide boundary layer energization in the manner described for improving flow conditions in conjunction with inlets having turning vanes located therein.

These and other objects of this invention will become readily apparent from the following detail description of the accompanying drawings in which:

Fig. 3 is a partial cross-sectional view illustrating a flush inlet having turning vanes located therein.

Fig. 4 is a partial view illustrating a flush inlet similar to Fig. 3 but having different vortex generating means.

Fig. 5 is a cross-sectional view of Fig. 4 showing the vortex producing wing in exaggerated form.

The advent of high speed aircraft having high performance power plants has increased the importance of reducing drag resulting from external protrusions which tend to mar the streamline external contour of the aircraft and reduce its performance. It has been the practice in the past to utilize air scoops which have their openings spaced from the adjoining external aircraft surface so that the boundary layer on the external surface will be bled past the scoop and the full impact pressure of the main airstream can be realized throughout the cross-sectional area of the scoop opening. Although air inlets have been provided having openings directly in the nose of the aircraft or in the wing leading edges, such installations require excessive lengths of ducting which inherently cause frictional losses or else design problems become difficult by attempting to locate the power plant as near as possible to these openings.

By providing flush type inlets, the openings therefor may be located as closely as possible to the unit requiring air from the free airstream. However, with flush type inlets, fluid separation readily occurs at the inlet or along the inlet duct walls so that poor velocity distribution transversely of said ducts and poor pressure recovery within the ducts has been experienced.

To this end, this invention relates to a simple yet efficient means for energizing the boundary layer flow upstream of flush air inlets so as to eliminate and delay fluid separation and thereby provide highly efficient flush air inlet configurations.

Figure 1:
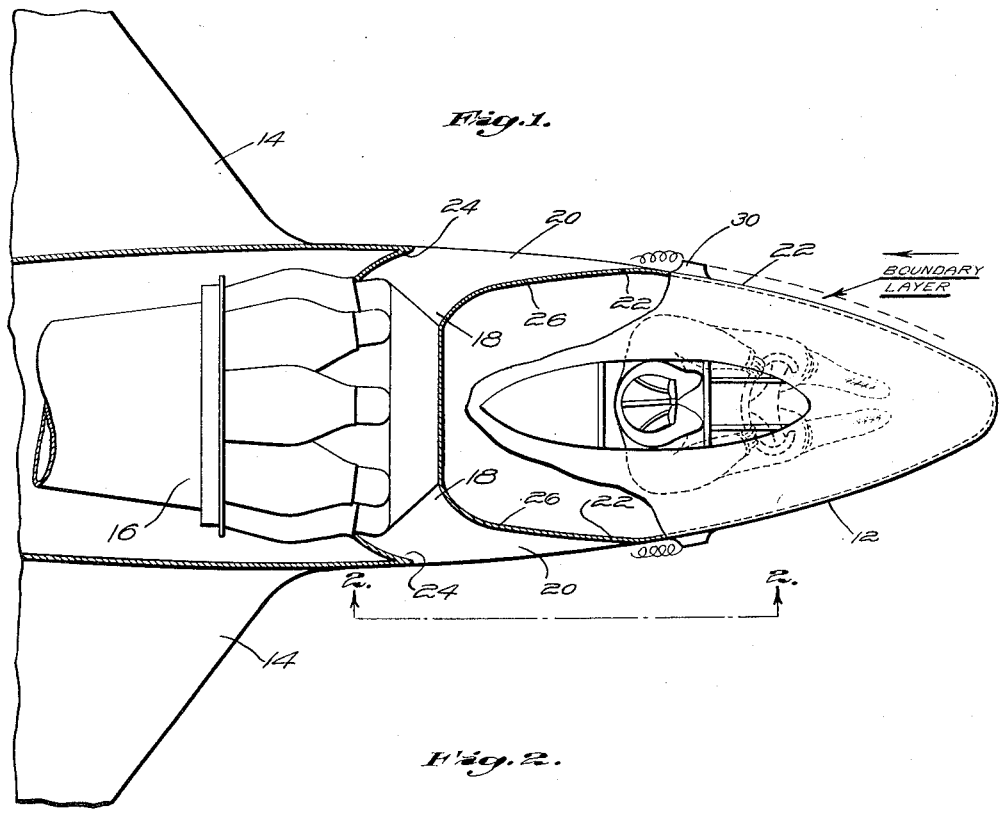
Fig. 1 is a partial cross-sectional view of an aircraft having flush air inlets according to this invention.

Referring to Fig. 1, an aircraft fuselage 12 is shown having wings 14 extending laterally on either side thereof and a power plant 16 for which combustion air must be provided. Air inlet ducts 18 conduct combustion air to the power plant 16 and terminate in fluid receiving openings 20 at the external surface 22 of the fuselage over which the free airstream is adapted to flow. The openings 20 have a forward or upstream lip 22 and an aft or downstream lip 24 which define the extent of opening 20. The lip 22 is contiguous with the outer external surface 22 of the fuselage and cooperates with an upstream wall portion 26 of the duct 18, which wall portion diverges in a downstream and an inboard direction from the external contour of the fuselage 12. The duct 18 may have its walls diverge as it approaches the power plant 16 so as to provide a diffuser action and change the velocity energy on the inlet air into pressure energy prior to entrance of the air into the engine. Due to the boundary layer flow which exists along the external surface 22 of the fuselage, the air velocity adjacent the lip 22, as the air turns and is inducted into the opening 20, will be of lesser value than the velocity of the air moving adjacent the aft lip 24 of the opening. As a result, the mass of air capable of being inducted for a given area of opening is not fully realized while also due to the divergence of the wall 26 fluid separation may occur therealong so as to further reduce the efficiency of induction of air by the flush opening 20.

According to this invention then, a plurality of fins 30 of airfoil shape are provided along the external surface 22 upstream of the opening 20. These fins have their chordwise dimension inclined relative to the axis of flow and terminate in tips adjacent the imaginary surface separating the main stream flow and the boundary layer flow of the free airstream. As a result, tip vortices are produced which trail downstream along this imaginary surface, thus mixing and systematically utilizing a portion of the main stream flow to energize the relatively slow moving boundary layer by a smooth displacement action.

The use of fins of airfoil shape to energize boundary layer in this manner (by replacement with high energy of the main stream) does not form a specific part of this invention and is more clearly described and claimed in co-pending patent application Serial No. 769,042, filed August 16, 1947, by Hendrik Bruynes, which application matured into Patent No. 2,558,816, dated July 3, 1951.

A plurality of vanes 30 are utilized and these are spaced transversely of the axis of flow with adjacent vanes inclined either in the same direction to produce adjacent co-rotating vortices or adjacent fins may be oppositely inclined relative to the axis of free stream flow to produce adjacent counter-rotating vortices. The fins 30, however, are located in substantial alignment with the opening 20 along the axis of flow, as seen for example in Fig. 2, to insure that the vortices trail downstream into the opening 20 to energize the boundary layer continuously along the diverging portion 26 of the duct 18. Hence, separation of fluid along the diverging wall portion 26 is eliminated so that the inducted air will tend to follow the curvature of the wall to a point well within the duct 18 so that efficient air induction is obtained.

Figure 2:
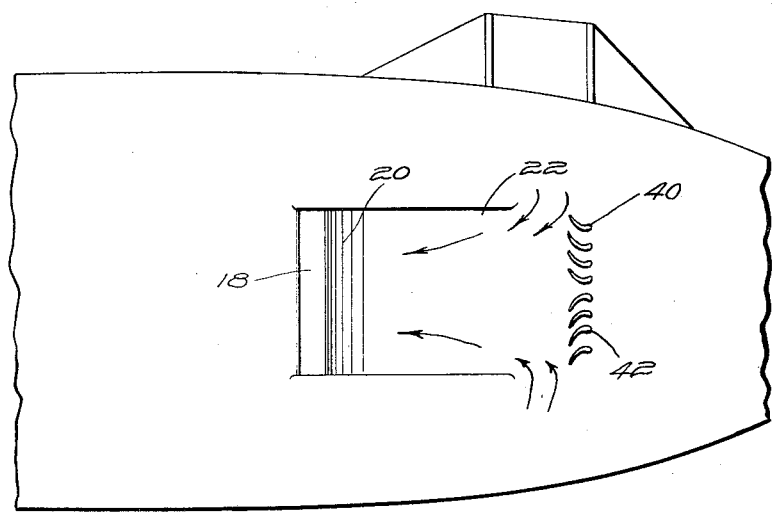
Fig. 2 is a partial view taken along the line 2—2 of Fig. 1.

The particular illustration in Fig. 2 comprises a plurality of fins 40 and 42 arranged in oppositely inclined sets. Thus the chordwise dimension of the fins 40 is oppositely inclined to the airstream relative to the fins 42. As a result, the vortices which trail downstream from each of the fin sets 40 and 42 impart motion to a portion of the main stream and energize boundary layer flow at the threshold of the opening 20 and well within the opening. The general result of the vortex motion is to sweep down toward the confining surface 22 and toward the center line of the inlet to concentrate boundary layer energization at the inlet.

With this configuration, it is to be noted that boundary layer energization is produced by tending to displace the boundary layer flow with a portion of the higher velocity energy of the main stream flow in such a manner that the vortices rotate from the main stream flow and into the boundary layer toward the longitudinal axis of the inlet and also trail downstream into the inlet 20.

In certain installations it may not be desirable or, due to the space requirements, it may not be possible to provide a gradual downstream divergence of the upstream wall of the inlet duct. In other words, as seen in Fig. 3, a flush opening 70 may be provided with a duct 72 leading internally of the aircraft 74 at an extremely high angle relative to the free stream axis. A plurality of turning vanes 76 may be provided within the opening 70 so as not to protrude externally of the fuselage contour. The turning vanes 76 may be of airfoil shape and if so desired may be so arranged so as to form diffuser passages 78 therebetween. In order to prevent separation along the sharp duct curvature 80 or the vanes 76 and in order to provide uniform velocity distribution across all of the turning vanes 76, one or more sets of vortex producing fins 84 may be provided, as shown. The vortex producing fins 84 will result in boundary layer energization in much the same manner described here above.

Hence, not only will separation be eliminated over the upstream lip but also over and between the turning vanes.

A preferred method for producing vortices during high velocity flow is shown in Figs. 4 and 5. As shown herein, a low aspect ratio airfoil 88 is mounted, as by means of a strut 89, adjacent the upstream lip of the diverging inlet wall 90. The wing or airfoil 88 is spaced from the confining aircraft surface 92 and is fixed at a positive angle of attack relative to the main airstream. Vortices emanate from the tips of the airfoil 88 and trail downstream into the inlet 70 as shown by the arrows. The vortices energize boundary layer flow in the same manner as previously described in connection with Figs. 1 and 3.

By being able to conduct the air away from the axis of the main stream at a substantial angle, as illustrated in Figs. 1, 3 and 5, while maintaining high efficiencies of air induction, it will be evident that icing problems will be reduced inasmuch as the moisture in the free airstream will tend to be centrifuged outwardly to continue on with the free airstream as the inducted air turns in following the contour of the inlet duct walls.

It is therefore apparent that as a result of this invention a highly efficient yet simple means has been provided for inducting air through flush inlets thereby eliminating external drag producing scoops and the like. It should be noted that the use of vortex producing fins in the manner shown produces an overall increase in efficiency of flow and that the slight drag that may be produced by the fins and the slight reduction of energy of the main stream is substantially negligible. The relationship of the loss of main stream energy and the resultant overall increase in efficiency of airflow in the total stream is better described in the above-mentioned patent application and also in copending patent application Serial No. 112,723, filed August 27, 1949, by Henry H. Hoadley, now Patent No. 2,650,752.

The improved induction means illustrated herein permits efficient space utilization and shorter duct lengths which is particularly useful in compact high speed aircraft.

Although certain embodiments of this invention have been illustrated and described herein, it will be evident that various changes and modifications may be made in the construction and arrangement of the various cooperating elements without departing from the scope of this novel concept.

What it is desired to obtain by Letters Patent is:

1. Fluid flow inducing means for a fluid intake duct leading from a surface bounding a main fluid stream, which stream includes a boundary layer immediately adjacent said surface, said inducing means comprising at least one fin of lift producing contour located upstream of the junction of the duct with said surface and having a tip projecting into the main fluid stream adjacent the imaginary surface separating the boundary layer and main stream flows, said fin having its chordwise dimension inclined relative to the axis of main stream flow for producing at least one tip vortex trailing downstream thereof.

2. In an aircraft having a surface over which air flows when the airplane is in flight, and an air intake duct leading from said surface into the interior of the airplane, and means for inducing a flow of air into the intake duct opening comprising, fins of airfoil shape extending from said surface substantially normal to the axis of flow and having their chordwise dimension inclined relative to the oncoming stream, said fins terminating in vortex producing tips for energizing the boundary layer air over said surface whereby fluid separation is deterred at said opening.

3. In an aircraft having a surface over which air flows when the airplane is in flight, an air inlet substantially flush with said surface leading to the interior of the aircraft, and means for improving the flow of air into said air inlet comprising fins of airfoil shape extending from said surface and spaced upstream of said inlet, said fins having their chordwise dimension set at a positive angle of attack terminating in vortex producing tips located adjacent the area separating the main stream and boundary layer flow along said surface thereby entraining said boundary layer and delaying fluid separation over the upstream lip of said inlet.

4. In an aircraft having a streamlined surface over which a free airstream is adapted to flow during flight, an air inlet substantially flush with said surface for conducting a portion of the free airstream internally of the aircraft comprising an upstream lip adjacent said streamlined surface and a duct having an upstream wall portion forming a downstream recessed continuation of said streamlined surface and upstream lip, said duct forming a diverging confining passage leading internally of the aircraft, and means for obtaining substantial flow into the inlet comprising a plurality of fins of airfoil shape extending from the aircraft surface upstream of said lip and terminating in vortex producing tips adjacent the region where the boundary layer velocity approaches main stream velocity whereby fluid separation adjacent said lip is eliminated and high velocity free stream flow follows said recessed wall portion and is induced into said inlet and duct.

5. In an aircraft according to claim 4 wherein said fins have their chordwise dimension inclined relative to the axis of free stream flow and are spaced transversely of said axis, the fins on one side of the center line of said inlet being oppositely inclined to the fins on the other side of said center line whereby adjacent counterrotating vortices are produced downstream thereof.

6. In an aircraft according to claim 5 wherein said recessed wall portion diverges substantially from the streamlined aircraft surface whereby moisture in the free airstream flowing over said last mentioned surface is separated by inertia prior to entry of the air into said inlet.

7. In an aircraft having a surface over which the free airstream is adapted to flow during flight, an air inlet substantially flush with said surface leading to the interior of the aircraft at a substantial angle relative to the free airstream axis and including a plurality of turning vanes therein, which turning vanes are positioned inboard of the general contour of said surface away from exposure to the free airstream, and which turning vanes comprise spaced airfoil shaped members forming diffuser passages therebetween, and means for improving the flow efficiency and pressure recovery adjacent said vanes comprising fins of airfoil shape extending from said aircraft surface and located upstream of said inlet, said fins having their chordwise dimension set at an angle relative to the stream and terminating in vortex producing tips adjacent the imaginary surface separating the boundary layer and main stream flows thereby energizing the boundary layer and eliminating separation adjacent the upstream end of said inlet.

8. In an aircraft according to claim 7 wherein the fins are spaced transversely of the longitudinal axis of said inlet and fins on one side of said axis have their chordwise dimensions oppositely inclined relative to the fins on the other side of said axis whereby adjacent counterrotating vortices are produced downstream thereof.

9. In an aircraft having a streamlined surface over which the free airstream is adapted to flow, an air inlet duct terminating at said surface and leading to the interior of the aircraft, said duct having an upstream lip contiguous with said surface and having an upstream wall portion gradually diverging in an inboard direction from said streamlined surface downstream of said lip, a downstream wall portion of said duct terminating at said surface and forming a downstream lip for said inlet duct, means comprising an inboard portion of said duct for conducting the air received by the inlet at a substantial angle from the free stream axis including fluid confining wall portions located substantially downstream of said upstream lip, and means for improving the flow of air into said conducting means comprising vortex producing fins protruding from said streamlined surface upstream of said conducting means for eliminating fluid separation over said diverging wall portion, said fins having their chordwise dimension inclined relative to the axis of flow and terminating in tips adjacent the line separating the main portion of the free airstream and the boundary layer whereby the latter is energized by intermixing a portion of the high velocity main stream with said boundary layer flow.

10. In an aircraft according to claim 9 wherein said fins are spaced transversely of the axis of flow and in substantial axial alignment with said inlet.

11. In an air inlet for an aircraft comprising an opening in an external surface of the aircraft, a duct leading from said opening to the interior of the aircraft at a relatively high angle to the external aircraft surface and the axis of free airstream flow, a plurality of turning vanes located in said opening for turning a portion of the free airstream into said duct, and means providing uniform velocity distribution across said opening comprising fins of airfoil shape extending from the external aircraft surface and spaced upstream of said opening in alignment therewith along the axis of free stream flow, said fins having their chordwise dimension set at an angle relative to the free stream flow and terminating in vortex producing tips adjacent the imaginary line separating the main stream and boundary layer portions of the free airstream, whereby the boundary layer is energized to a higher velocity at said opening.

12. In an air inlet for an aircraft comprising an opening in an external surface of the aircraft, a duct leading from said opening to the interior of the aircraft at a relatively high angle to the axis of free airstream flow, and means for preventing fluid separation over the upstream lip of said opening comprising a low aspect ratio airfoil fixed upstream of said lip and spaced from said external aircraft surface and at an angle of attack relative to the airstream, said airfoil having its major plane located adjacent the imaginary surface separating the main and boundary layer streams whereby vortices generated at the tips of said airfoil displace boundary layer flow with a portion of the main high speed stream downstream thereof.

13. In an air inlet for an aircraft comprising an opening in an external surface of the aircraft, a duct leading from said opening to the interior of the aircraft at a relatively high angle to said external surface, the upstream lip of said opening forming a continuation of said external surface and contiguous with a wall of said duct, a plurality of turning vanes in said duct adjacent said opening for turning inducted air at substantially right angles into said duct, said vanes forming diffuser passages therebetween for converting velocity energy into pressure energy, and means for energizing the boundary layer adjacent the lip of said opening to prevent separation over said lip and said vanes comprising a low aspect ratio wing located upstream of and in alignment with said opening, said wing being fixed at an angle of attack relative to the airstream and having its extremities in substantial alignment with the lateral extremities of said opening whereby tip vortices are produced to travel downstream and energize the boundary layer at said opening.

14. In an aircraft having a surface over which air flows when the airplane is in flight, and an air intake duct leading from said surface into the interior of the airplane, said duct merging with said surface in an opening substantially flush with said surface, and means for inducing a flow of air into the duct comprising, at least one fin of airfoil shape located in the airstream and terminating adjacent the line separating the main and boundary layer streams over said surface, said fin being located upstream of said opening along the axis of air flow over said surface and having its chordwise dimension inclined relative to said axis whereby a vortex trails downstream from said tip with its axis parallel to said line.

References Cited in the file of this patent

UNITED STATES PATENTS

| Number | Name | Date |
|---|---|---|
| 2,041,793 | Stalker | May 26, 1936 |
| 2,365,328 | Bell | Dec. 19, 1944 |